(12) United States Patent
Belzner et al.

(10) Patent No.: US 10,417,907 B2
(45) Date of Patent: Sep. 17, 2019

(54) METHOD FOR PROCESSING MEASUREMENT DATA OF A VEHICLE IN ORDER TO DETERMINE THE START OF A SEARCH FOR A PARKING SPACE AND COMPUTER PROGRAM PRODUCT

(71) Applicant: Bayerische Motoren Werke Aktiengesellschaft, Munich (DE)

(72) Inventors: Heidrun Belzner, Seefeld (DE); Daniel Kotzor, Seefeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 188 days.

(21) Appl. No.: 15/388,404

(22) Filed: Dec. 22, 2016

(65) Prior Publication Data

US 2017/0103649 A1 Apr. 13, 2017

Related U.S. Application Data

(63) Continuation of application No. PCT/EP2015/062390, filed on Jun. 3, 2015.

(30) Foreign Application Priority Data

Jun. 26, 2014 (DE) .................. 10 2014 212 336

(51) Int. Cl.
*G08G 1/01* (2006.01)
*G01C 21/34* (2006.01)
(Continued)

(52) U.S. Cl.
CPC .......... *G08G 1/0133* (2013.01); *G01C 21/34* (2013.01); *G01C 21/3407* (2013.01);
(Continued)

(58) Field of Classification Search
None
See application file for complete search history.

(56) References Cited

U.S. PATENT DOCUMENTS 8,700,314 B2    4/2014  Vavrus et al.
8,847,791 B1 *  9/2014  Urbach ............... G08G 1/0112
                                                340/932.2
(Continued)

FOREIGN PATENT DOCUMENTS

CN           102637369 A     8/2012
DE     11 2009 000 145 T5    2/2011
(Continued)

OTHER PUBLICATIONS

Kaplan et. al., Exploring en-route parking type and parking-search route choice: decision making framework and survey design, 2011 (Year: 2011).*

(Continued)

*Primary Examiner* — Kevin P Mahne
(74) *Attorney, Agent, or Firm* — Crowell & Moring LLP

(57) ABSTRACT

Processing position data relating to a vehicle, in order to determine the start of a search for a parking space, includes determining an end position and determining at least one inefficiency value by comparing at least part of a drive with at least one linear distance to the end position, wherein the at least one inefficiency value identifies an inefficiency of the drive. The process further includes determining at least one route inefficiency value based on position data from a map to verify an identified inefficiency for at least one position for which an inefficiency has been identified. Parking space search traffic can then be output, as detected, if there is a route inefficiency.

13 Claims, 6 Drawing Sheets

(51) Int. Cl.
*G08G 1/0968* (2006.01)
*G08G 1/14* (2006.01)

(52) U.S. Cl.
CPC ....... *G01C 21/3446* (2013.01); *G08G 1/0112* (2013.01); *G08G 1/0129* (2013.01); *G08G 1/096827* (2013.01); *G01C 21/3415* (2013.01); *G08G 1/14* (2013.01); *G08G 1/143* (2013.01); *G08G 1/147* (2013.01)

(56) References Cited

U.S. PATENT DOCUMENTS

| | | | | |
|---|---|---|---|---|
| 9,547,307 | B1* | 1/2017 | Cullinane | E05F 15/70 |
| 9,995,584 | B1* | 6/2018 | Kanevsky | G01C 21/12 |
| 2004/0107048 | A1* | 6/2004 | Yokota | G01C 21/34 |
| | | | | 701/431 |
| 2005/0253753 | A1* | 11/2005 | Lalik | G01C 21/20 |
| | | | | 342/357.31 |
| 2009/0187341 | A1* | 7/2009 | Vavrus | G01C 21/20 |
| | | | | 701/414 |
| 2010/0052946 | A1* | 3/2010 | Levine | G08G 1/143 |
| | | | | 340/932.2 |
| 2011/0106426 | A1* | 5/2011 | Tertoolen | G01C 21/3476 |
| | | | | 701/533 |
| 2011/0221585 | A1* | 9/2011 | Higuchi | G01C 21/3697 |
| | | | | 340/438 |
| 2012/0136529 | A1* | 5/2012 | Curtis | G01C 21/20 |
| | | | | 701/32.2 |
| 2013/0073143 | A1* | 3/2013 | Miura | G01C 21/00 |
| | | | | 701/36 |
| 2013/0144826 | A1* | 6/2013 | Kandal | G08G 1/14 |
| | | | | 706/46 |
| 2014/0058711 | A1* | 2/2014 | Scofield | G06Q 10/04 |
| | | | | 703/6 |
| 2014/0145862 | A1* | 5/2014 | Wang | G08G 1/141 |
| | | | | 340/932.2 |
| 2014/0214319 | A1* | 7/2014 | Vucetic | G01C 21/3685 |
| | | | | 701/533 |
| 2014/0340242 | A1* | 11/2014 | Belzner | G08G 1/14 |
| | | | | 340/932.2 |
| 2015/0123818 | A1* | 5/2015 | Sellschopp | G01C 21/3484 |
| | | | | 340/932.2 |
| 2016/0163197 | A1* | 6/2016 | Levy | G08G 1/147 |
| | | | | 340/932.2 |
| 2016/0313136 | A1* | 10/2016 | Castellucci | G01C 21/3605 |
| 2017/0025000 | A1* | 1/2017 | Lagassey | B64C 37/02 |

FOREIGN PATENT DOCUMENTS

| | | |
|---|---|---|
| DE | 10 2012 201 472 A1 | 8/2013 |
| DE | 10 2012 212 347 A1 | 1/2014 |
| EP | 2 332 021 B1 | 6/2011 |
| EP | 2 602 777 A1 | 6/2013 |
| JP | 2005-257622 A | 9/2005 |
| JP | 2012-177712 A | 9/2012 |
| WO | WO 2009/091626 A1 | 7/2009 |
| WO | WO 2010/023571 A1 | 3/2010 |
| WO | WO 2014/056843 A1 | 4/2014 |

OTHER PUBLICATIONS

Kanennatsu JP 2005-257622-A EPO machine translation Apr. 13, 2019. (Year: 2019).*
PCT/EP2015/062390, International Search Report dated Sep. 11, 2015 (Three (3) pages).
Chinese Office Action issued in Chinese counterpart application No. 201580022129.5 dated Jun. 28, 2018, with partial English translation (Twelve (12) pages).

* cited by examiner

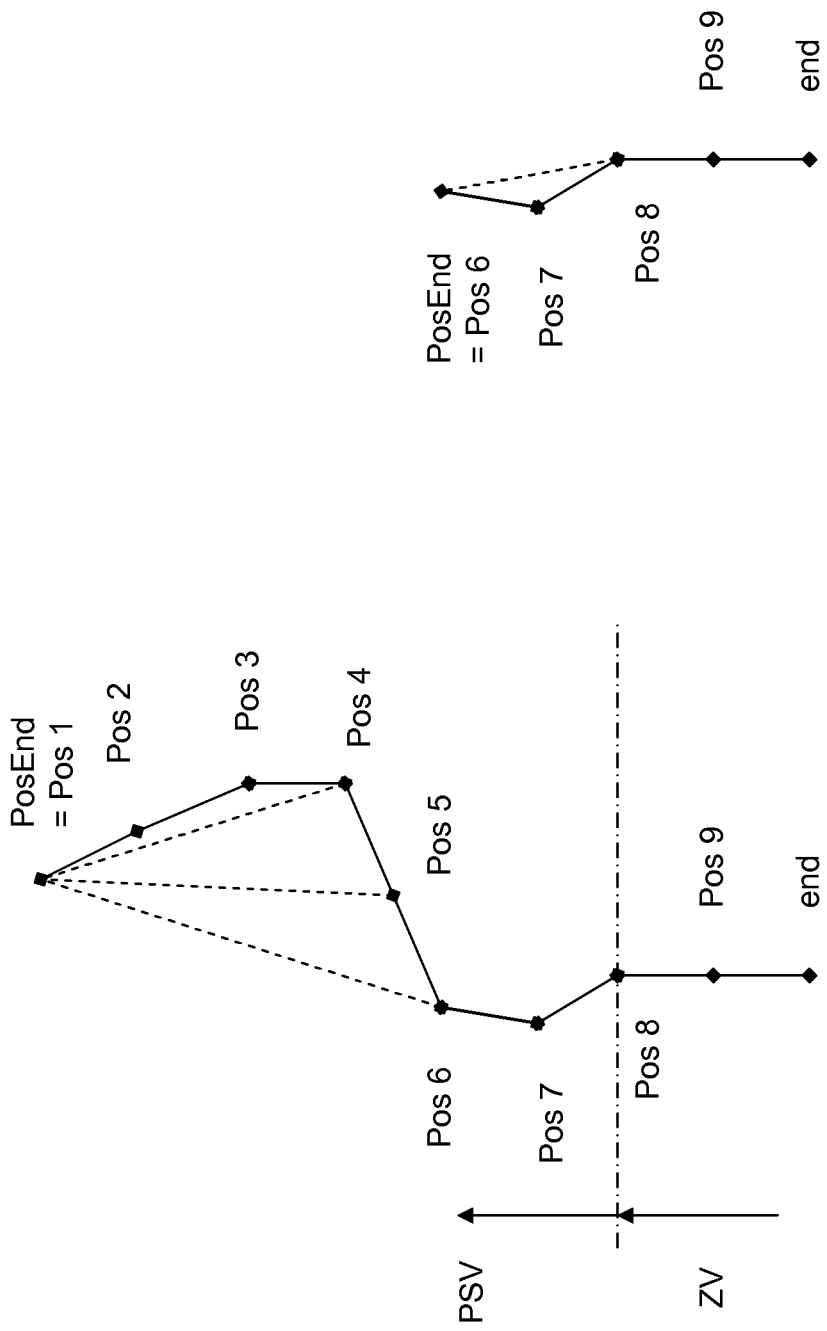

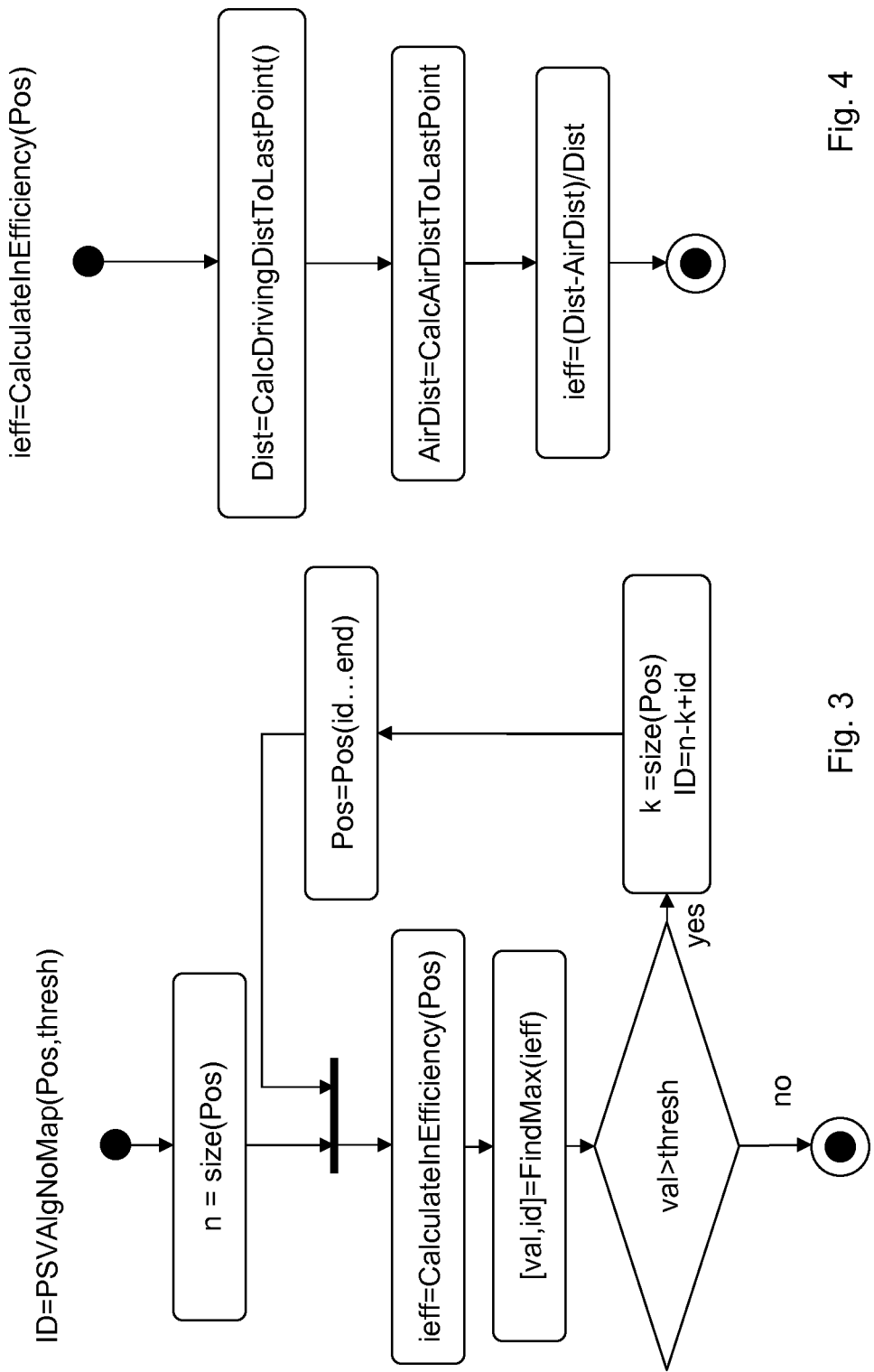

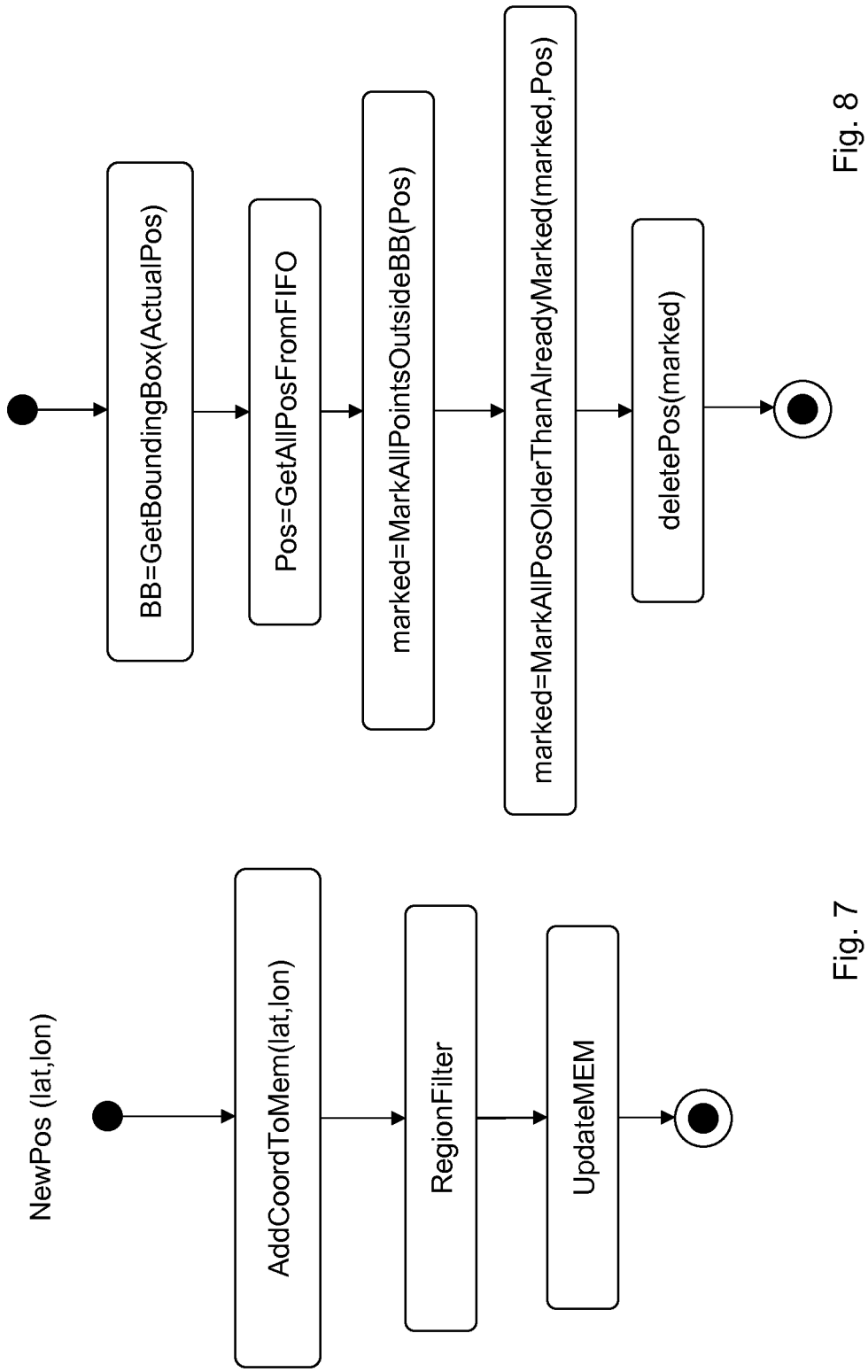

METHOD FOR PROCESSING MEASUREMENT DATA OF A VEHICLE IN ORDER TO DETERMINE THE START OF A SEARCH FOR A PARKING SPACE AND COMPUTER PROGRAM PRODUCT

CROSS REFERENCE TO RELATED APPLICATIONS

This application is a continuation of PCT International Application No. PCT/EP2015/062390, filed Jun. 3, 2015, which claims priority under 35 U.S.C. § 119 from German Patent Application No. 10 2014 212 336.4, filed Jun. 26, 2014, the entire disclosures of which are herein expressly incorporated by reference.

BACKGROUND AND SUMMARY OF THE INVENTION

The present invention relates to a method for processing measurement data from a vehicle in order to determine the start of a search for a parking space and to a computer program product.

It is very important to determine the start of a search for a parking space for different parking information services and for urban planning, for example.

Current parking services provide information relating to parking garages and publicly or commercially operated P+R installations (location, utilization, reservation). The parking situation in the public road space is mostly unknown. Only occasionally are streets equipped with stationary sensors, such as in San Francisco.

Dynamic information relating to the parking space situation in the road space is demanded more and more. The plurality of apps on the market use singular events of entering and leaving a parking space which are either intended to be communicated by the user directly or are intended to be detected with the aid of a smartphone (DE 10 2012 212 347 A1) or sensors.

In order to improve the estimation of the availability of parking spaces, a statement relating to the current parking space search traffic is of decisive added value. For this purpose, many apps use the input by the user as of when he is searching for a parking space.

Furthermore, DE 10 2012 201 472 A1 describes a method for providing parking information relating to free parking spaces. In this case, a system for generating parking information is used. In this method, the parking space search traffic is determined and is used as an input variable for the system in the method.

The quality of community-based apps is strongly dependent on the number and quality of inputs by the users. Therefore, a method which takes place in an automated manner is desirable.

The systems which have previously been presented have a few disadvantages. For example, in the case of the system presented in DE 10 2012 201 472 A1, it is disadvantageous that it is strongly dependent on the calibration of the parameters. In addition, the start of the parking space search traffic can be detected only at two specific points.

The object of the present invention is therefore to provide a solution which can be used to easily and reliably determine the start of parking space search traffic.

The invention is based on the knowledge that this object can be achieved by provisionally determining the start of the parking space search traffic using data available in the vehicle and then verifying the provisional result.

According to a first aspect, the invention therefore relates to a method for processing measurement data from a vehicle in order to determine the start of a search for a parking space. The method is characterized in that the measurement data are position data relating to the vehicle, an end position is determined, at least one inefficiency value is determined by comparing at least part of the drive with at least one linear distance to the end position and can be used to identify an inefficiency of the drive, a route inefficiency is determined by means of position data from a map in order to verify an identified inefficiency for at least one position for which an inefficiency has been identified, and parking space search traffic is output as detected if there is a route inefficiency.

According to the invention, the measurement data from a vehicle are position data. In this case, coordinates, in particular longitude and latitude information for a position, are referred to as position data. The position data may additionally contain a time stamp or other time information relating to the reception or determination of the coordinates. These position data may be determined using the Global Positioning System (GPS) or other positioning systems. These position data are received or determined at the vehicle. Additional information, for example the speed of the vehicle, is not needed to determine the start of a search for a parking space in the method according to the invention.

According to the invention, the start of the search for a parking space is also referred to as the start of parking space search traffic or detection of parking space search traffic. In this case, the start of the search for a parking space is indicated by position data relating to the position at which the vehicle is situated at the start of the search for a parking space.

The measurement data, which are referred to as position data below, can be processed according to the invention in the vehicle or in a central computer unit separate from the vehicle. During processing in the vehicle, the processing is carried out, in particular, in a so-called on-board unit. The processing in a central computer unit is also referred to as off-board processing.

The general idea which is used according to the invention to detect parking space search traffic is that a search for a parking space, that is to say parking space search traffic, is expressed by changes in the driver's behavior. According to the invention, it is therefore assumed that, in the case of a normal drive, which is also referred to as a drive to a destination and in which the driver is not searching for an available parking space, the driver selects the shortest route to his destination. Considered in the reverse manner from the parking position of the vehicle, it can therefore be checked whether there is a time from which the driver drastically deviates from this behavior.

In the method according to the invention, an end position of the vehicle is first of all determined for this purpose. The end position may be the actual parking position of the vehicle, a current position on the way to the parking position, or a target position can be used as the end position. In the latter case, it is assumed that the driver will park in the vicinity of the destination aimed for by the driver. According to the invention, the end position is expressed by means of position data, in particular longitude and latitude. In addition to these coordinates, the position data relating to the end position preferably contain an item of time information. The determination of the end position is explained in yet more detail below.

The start of a search for a parking space is determined in two stages in the method according to the invention.

In a first stage, an inefficiency is identified and, in the second stage, an inefficiency identified in this manner is verified.

In this case, a deviation from the shortest link between a drive position and the parking position is referred to as inefficiency.

In order to be able to identify an inefficiency, at least part of the drive is compared with at least one linear distance to the end position and at least one inefficiency value is determined or calculated in this case. This inefficiency value can then be used to identify an inefficiency of the drive.

The drive represents the distance actually covered by the vehicle. In the method according to the invention, the drive can be determined by means of a series of successive positions of the vehicle at which the vehicle was situated during the drive or is currently situated. The positions on the drive, which can also be referred to as drive positions, are expressed in the method according to the invention by means of position data, in particular longitudes and latitudes. These position data are received or determined at the vehicle as measurement data at regular intervals of time, for example every second. Therefore, the drive or part of the drive can be determined by summing the distances between the individual drive positions. The linear distance to the end position can likewise be determined from values available in the vehicle. The linear distance between the drive position and the end position is computationally determined. In this case, the shortest distance between the first drive position to be taken into account and the end position is calculated.

This first stage of the method can therefore be carried out solely using the position data from the vehicle.

According to the invention, an inefficiency value is calculated and can be used to identify a possible inefficiency of the drive. In this case, the identification is preferably made by comparing the inefficiency value with a predefined threshold value. If the inefficiency value exceeds the threshold value, it is possible that parking space search traffic has begun.

However, if such an inefficiency has been identified, parking space search traffic is not yet assumed in the method according to the invention. Rather, the identified inefficiency is verified.

In order to verify an identified inefficiency, at least one route inefficiency value is determined according to the invention by means of position data from a map for at least one position for which an inefficiency has been identified. In this case, a value which indicates a measure of whether and the extent to which there is a deviation from a shortest route determined using a map is referred to as a route inefficiency value. In this case, the route determined using a map can represent, in particular, route guidance which is determined by a navigation system and can also be referred to as a driving route or route. In this case, not only the presence of roads is taken into account, but possibly also the usability of the road for the planned drive. For example, obstacles such as one-way streets and the like can be taken into account during route guidance. However, in one simple embodiment, it is also sufficient if only the presence of a road is checked using the map data and the shortest route is calculated according to these map data. In this case, map data represent digital map position data. Like the position data relating to the vehicle as well, these map data are preferably stated as coordinates, in particular in longitudes and latitudes. This makes it possible to easily compare the drive positions and the map. The map data are present in the vehicle, for example in a navigation system, or these data can be accessed. In addition, a navigation system of a vehicle provides the so-called routing capability, that is to say the shortest route will be determined as route guidance between a drive position and the end position by means of the navigation system and will be provided for the method according to the invention. The terms "route on the map" and "route guidance" are used as synonyms below, unless indicated otherwise.

By virtue of the fact that the deviation from a route or route guidance, which has been determined on the basis of map data, is checked in the method according to the invention, it is possible to determine whether the originally identified inefficiency, that is to say the deviation from the shortest distance to the end position, is caused by the course of the road.

If the route inefficiency value exceeds a predefined threshold value, there is a route inefficiency, that is to say the driver deviates from the shortest route or route guidance to the end position and parking space search traffic can be reliably assumed.

In the method according to the invention, an inefficiency is verified only for the position(s) for which an inefficiency has been identified. In particular, the verification is carried out only for the points at which the inefficiency value exceeds a threshold value. This has the advantage that the computation effort for determining the parking space search traffic can be minimized. In particular, it is not necessary to carry out a comparison with a route or route guidance on a map for all drive positions of the drive.

Since, in contrast with the prior art, only position data are used to determine the inefficiency in the present invention and, in addition, a comparison by means of map data is carried out only if an inefficiency is detected, the computer power needed to carry out the method is minimized. In particular, there is no need to continuously compare the drive positions with map data. In addition, there is also no need for complicated determination of features or vectors for each drive position. The method can therefore also be carried out on a device provided in the vehicle, for example a so-called on-board unit, that is to say on-board determination of the parking space search traffic and, in particular, the start of the search for a parking space can be carried out. In addition, the method can also be carried out online, that is to say during the drive.

According to the present invention, the detection of the parking space search traffic preferably comprises the output of an item of information relating to at least the position at which the parking space search traffic has begun. This information may be, for example, an index which comprises coordinates and an item of time information relating to when the position was driven through. In addition, it is also possible to output corresponding information relating to the end point under consideration. This information can be processed and stored on-board and/or made available to an external computer unit for further processing.

According to one preferred embodiment, the inefficiency values are calculated as an inefficiency curve. In this case, an inefficiency value is preferably determined for each drive position of that part of the drive which is intended to be checked. A brief deviation from the normal driving behavior can be detected and can be disregarded for the further consideration by calculating the inefficiency values as an inefficiency curve.

However, if a maximum value of the inefficiency curve is exceeded for a drive position above a threshold value, an inefficiency is preferably considered to have been identified for this position. In order to be able to reliably determine the actual start of the search for a parking space, the position at which the inefficiency value is at a maximum is preferably first of all determined. In this case, the individual drive positions are considered in the reverse manner from the end position. If a maximum value has been selected, it is compared with a threshold value. If the inefficiency value exceeds the threshold value, an inefficiency can be assumed. However, in order to increase the reliability of the method further, if an inefficiency is identified for a position, further drive positions before this position can be checked from this position. If a maximum inefficiency value which exceeds a threshold value likewise results for a further drive position before this position, an inefficiency is identified for this further drive position and this further drive position is considered to be the possible start of the search for a parking space.

The positions at which an inefficiency is considered to have been identified are stored according to the invention in order to be available for the further method steps. Therefore, after the first drive position, considered in the reverse manner from the end position, at which an inefficiency could be considered to have been identified, has been determined, the positions before this identified position can also be easily checked for inefficiency.

According to one preferred embodiment, in order to determine the inefficiency value, the quotient of the difference from the distance of a previous position to the end position and the linear distance of the previous position to the end position to the difference from the distance of a previous position to the end position is calculated.

In this case, a previous position, which can also be referred to as a previous drive position, is understood as meaning a drive position which is or was driven through by the vehicle before the end position in terms of time.

The distance between the previous drive position and the end position is determined by summing the distances between the individual drive positions which are between this previous drive position and the end position. The linear distance to the end position is calculated for each individual drive position as the shortest distance between the respective drive position and the end position. By virtue of the fact that the quotient is formed from the difference between the driven route and the linear distance and the driven route, a relative deviation from the linear distance is determined. This value can be used to identify an inefficiency by means of comparison with a threshold value.

Before the comparison with a threshold value, the position at which the inefficiency value reaches a maximum is preferably determined. The inefficiency value of this position is then compared with the threshold value and an inefficiency can be considered to have been identified if the threshold value is exceeded. As already described above, the method step for identifying an inefficiency and determining the possible parking space search traffic can also be continued, however, after an inefficiency has been identified for a drive position. In this case, the inefficiency values which were determined in the first method step for all drive positions can be used for the drive positions further away from the end position. Alternatively, however, it is also possible for the maximum of the inefficiency value to be determined by using the previously identified position at which inefficiency can be assumed as the end position. If a drive position which is before the first position identified as inefficient and at which the inefficiency value is at a maximum is detected in this consideration, this inefficiency value is compared with the threshold value and this earlier drive position is used as the possible start of the search for a parking space if the threshold value is exceeded. The method is carried out until a position which divides the drive into two parts, an efficient route and an inefficient route, is identified. This position can therefore possibly represent the start of the parking space search traffic. The part of the drive after this position, that is to say between the start of the parking space search traffic and the end position, would then become the parking space search traffic and the part of the drive before this position, that is to say before the start of the parking space search traffic, would then become the so-called destination traffic. However, these assumptions are checked again in the method according to the invention by verifying the inefficiency.

The method for determining the inefficiency values and continuing the method after detecting a maximum inefficiency value above a threshold value is schematically shown in FIGS. 1 and 2. In the figures, the drive is represented by a solid line and the linear distance of some drive positions to the end position (PosEnd) is indicated by dashed lines.

In FIG. 1, the end position PosEnd is denoted Pos 1. This end position can represent the actual parking position, a current drive position or the target position. The drive positions driven through before the end position Pos 1 are denoted Pos 2 to end. In this case, the numbering increases from the end position since the method according to the invention preferably starts from the end position, that is to say the drive positions are considered in the sequence contrary to the driving direction. In the embodiment illustrated in FIG. 1, a maximum inefficiency value which is above a predefined threshold value is detected at the position Pos 6, for example. Therefore, the parking space search traffic could have begun at the position Pos 6. However, this result is preferably checked further. An embodiment for this is shown in FIG. 2. In this case, the position Pos 6 identified as the possible start is considered as the end position (PosEnd) and the inefficiency values are determined for the further positions Pos 7 to end. In this case, in the embodiment illustrated, it is revealed that a maximum inefficiency value which exceeds a predefined threshold value is present at the position Pos 8. Therefore, Pos 8 is considered to be the possible start of the parking space search traffic instead of the original position Pos 6.

The subdivision of the drive into parking space search traffic (PSV) and destination traffic (ZV) is schematically indicated in FIG. 1.

The steps for calculating the inefficiency values and the identification of inefficiency according to one preferred embodiment can be represented by the flowcharts shown in FIGS. 3 and 4. In this case, the left-hand branch of the flowchart indicates the determination of the maximum inefficiency value and the comparison with the threshold value and the right-hand branch shows the feedback as to whether there is a further position at which inefficiency is identified before a possible start of the search for a parking space which has been identified in this manner.

By virtue of the fact that only the position data relating to the drive positions and the end position are needed to determine the inefficiency, continuous route guidance (routing) is not required in the method according to the invention. In addition, the determination of the drive and of the linear distance are simple calculations which only give rise to a small amount of computation effort. Finally, the storage requirement of the memory which stores the data needed for this type of inefficiency calculation is low. In particular, there is no need to store the speed of the direction change and the like.

In order to determine the route inefficiency value, the quotient of the difference from the distance of a previous position to the end position and the distance of the previous position to the end position on a route on a map to the difference from the distance of a previous position to the end position is preferably calculated.

These distances can also be calculated in a simple manner and require only a small amount of computation effort and low storage capacity.

The verification of the inefficiency against the map data, in particular the route on the map, is schematically shown in FIG. 5. In this case, a drive position previously identified as inefficient (indicated as Pos 1 in FIG. 5) is used. From this drive position Pos 1, the actually driven distance, that is to say the drive which indicates the actually driven distance, on the one hand, and the distance along a route or route guidance on the map from Pos 1 to the end position, on the other hand, are calculated. The route inefficiency for the position Pos 1 is determined from these two values and is compared with a threshold value.

Parking space search traffic from this time on, that is to say this position, is assumed only if this verification also leads to the result that the route inefficiency is above the threshold value. In contrast, if the inefficiency is below the threshold value, it is considered to have been detected that the originally detected inefficiency can be attributed to the road layout, that is to say the driver could not have taken a more efficient route.

During verification, the distance calculated from the drive positions is therefore not compared with the linear distance, as in the calculation of the inefficiency values, but rather with a distance determined on the basis of the map data. This distance determined on the basis of the map data preferably represents the route guidance determined by a navigation system, for example.

Only the first position of the drive in the driving direction at which an inefficiency has been identified, that is to say the first position on the drive at which the start of the parking space search traffic is assumed, is preferably verified. However, it is also possible for all drive positions at which a possible inefficiency has been identified, at which the inefficiency value is greater than a threshold value, to be verified. The position which is at the greatest distance from the end position in terms of time is referred to as the first position of the drive in the driving direction at which an inefficiency has been identified. As described above, in the method according to the invention, a position at which there is inefficiency is identified in the sequence of the drive positions contrary to the driving direction. If a position is identified in this manner, the possible presence of a further position at which there is inefficiency is preferably checked in the direction counter to the driving direction. The position found last in this method therefore represents the first position of the drive in the driving direction. The inefficiency identified for this position is then verified.

According to one preferred embodiment, before the comparison with the linear distance, the position data are filtered by checking the affiliation with a defined region.

By virtue of the fact that the position data are filtered before determining the inefficiency, the storage requirement for the method according to the invention can be reduced, on the one hand. On the other hand, however, the accuracy of the result of the method according to the invention can also be increased and the calculation effort can be minimized.

Since only the position data, in particular the longitude and latitude, are used to determine the parking space search traffic in the method according to the invention, the position data are preferably filtered with regard to at least one criterion which can be derived from the position data. For this reason, the position data acquired at the vehicle, for example by means of GPS, are preferably filtered with regard to their relative position with respect to the end position, in particular with respect to the distance to the end position. Only position data which are within a defined region with respect to the end position are therefore used. The region within which the position data must lie around the end position can be defined, for example, by means of a circle having a defined diameter around the end position. This minimizes the amount of position data to be processed.

In addition, only continuous position data in the defined region are preferably used for the comparison. More preferably, only the last set of continuously acquired position data is used for the comparison. For this purpose, the position data are preferably provided with time stamps. It is therefore possible to detect which position data have been acquired or received in succession and the last continuously acquired set of position data before the end position can therefore be determined.

According to one preferred embodiment, the defined region within which the position data to be taken into account, that is to say the position data which have not been filtered out, must lie is defined as a rectangle. The rectangle has a defined side length. The use of a rectangle, preferably a square, for the region within which the position data to be taken into account must lie has the advantage that this region can be determined with little computation effort and the affiliation of drive positions with the defined region can be easily determined.

The defined region, and preferably the rectangle, is preferably defined around the current position of the vehicle. The current position is therefore in the center of the region, in particular of the rectangle. In this manner, the largest possible quantity of drive positions before the current drive position is acquired from the region and is taken into account when determining the inefficiency. In this case, the current position is considered to be the end position for the purpose of determining the inefficiency value.

The method according to the invention can be carried out online, that is to say in real time during the drive. Alternatively, however, it is also possible to carry out the method after conclusion of the drive. In this case, the method is referred to as offline, that is to say after the drive.

According to one embodiment, the method according to the invention is carried out during the drive of the vehicle and the end position corresponds to the destination. In this embodiment, route guidance, for example by a navigation system to which the driver inputs the desired destination, is required. The destination can be read from the navigation system. Since it is assumed that the parking position is at or in the vicinity of the destination, the use of the stated destination as the end position is sufficiently accurate to be able to detect parking space search traffic. Alternatively, however, when carrying out the method during the drive, it is also possible for the current position of the vehicle to be used as the end position instead of a destination input by the driver. In this embodiment, the determination regarding whether there is parking space search traffic is therefore preferably carried out continuously during the drive. Once a parking position has been reached, this last current drive position is used as the end position and the method according to the invention is then carried out with this end position.

According to one alternative embodiment, the method according to the invention is carried out after conclusion of the drive of the vehicle and the end position corresponds to the actual parking position. Since the parking position is known after conclusion of the drive, this parking position can be used as the end position in a so-called offline method.

In this embodiment, the position data collected over the drive can be used. Since the end position is fixed, determination of the parking space search traffic once is therefore sufficient and the computation effort is therefore reduced further.

If parking space search traffic is detected using the method according to the invention, that is to say the start of the search for a parking space is output, this information can be used further for different purposes. For example, this information may be important for predicting parking information or for urban planners. In this case, it is possible to use, for example, the method for providing parking information relating to free parking spaces, as described in DE 10 2012 201 472 A1, and the result of the method according to the invention can be used there as an input variable. However, it is also possible to use the result of the method according to the invention for other methods for calculating or providing parking space information. The result of the method according to the invention is preferably output as information relating to the position of the start of the search for a parking space together with an item of time information relating to the start of the search for a parking space and corresponding information relating to the end position. The information relating to the start of the search for a parking space and possibly also relating to the end position can be output as an index (ID).

According to another aspect, the invention relates to a computer program product which can be loaded into a digital computer or computer system, in particular into the internal memory, and comprises software code sections which are used to carry out the steps of the method according to the invention if the product runs on the computer or computer system.

The software code sections can also be referred to as an algorithm. The computer program product preferably comprises at least two sections, one section representing the step of acquiring and preferably filtering drive position data and the second section being used to evaluate the search for a parking space, that is to say to determine parking space search traffic. The first section can therefore also be referred to as a trace logger and the second section can be referred to as ParkSearchEvaluation. The two sections of the computer program product which preferably represent software code sections are preferably connected to one another in such a manner that the results of the trace logger can be directly or indirectly made available to the ParkSearchEvaluation. The results of the trace logger are particularly preferably made available indirectly to the ParkSearchEvaluation and, in particular, are first of all stored in a memory which preferably represents a first-in-first-out (FIFO) memory.

The computer program product and, in particular, the software code sections preferably have at least one interface to a navigation system of the vehicle. This interface can be stored as a fetch instruction in the software code section. A route or route guidance required for the method according to the invention or other map data can be retrieved from the navigation system via this interface. In particular, such an interface is provided for the ParkSearchEvaluation software code section. The two stages of the method according to the invention, which can be referred to as identification of an inefficiency and verification of the result, are carried out in the ParkSearchEvaluation.

According to the invention, the software code section(s) can preferably access the longitudes and latitudes of the positions of the vehicle with a frequency of one second, for example. In addition, the software code section may also comprise a function which allows the calculation of the routed distance within a map from two positions or can access such a function.

Advantages and features described with respect to the method according to the invention likewise apply, if applicable, to the computer program product according to the invention and vice versa. In this case, the advantages and features are possibly described only once.

Other objects, advantages and novel features of the present invention will become apparent from the following detailed description of one or more preferred embodiments when considered in conjunction with the accompanying drawings.

BRIEF DESCRIPTION OF THE DRAWINGS

The invention is now described again with reference to the figures and the possible embodiments shown in the latter.

FIGS. 1 and 2 schematically show a method for determining the inefficiency values and continuing the method after detecting a maximum inefficiency value above a threshold value, in accordance with one embodiment of the invention;

FIGS. 3 and 4 illustrate a flowchart of the steps for calculating the inefficiency values and the identification of inefficiency according to one embodiment of the invention;

FIGS. 7 and 8 set forth a flowchart illustrating how, in accordance with one embodiment of the invention, whenever a new drive position is recorded, the trace logger adds the coordinates to the FIFO and then applies a filter in order to delete irrelevant data.

DETAILED DESCRIPTION OF THE DRAWINGS

In the method according to the invention, two parallel processes, which can be carried out by parallel software code sections for example, are carried out. On the one hand, the drive, which can also be referred to as a trace or path, is stored. Storage is also referred to as logging. One process of the method according to the invention or the algorithm is therefore also referred to as a trace logger. The second process is referred to as parking space search traffic evaluation or ParkSearchEvaluation.

During the trace logger process, drive data from the past to the present, which can also be referred to as trace data and represent, in particular, position data in the form of coordinates, possibly with a time stamp, are analyzed. In order to keep the storage requirement low, a first-in-first-out (FIFO) memory is designed, which memory retains only longitudes and latitudes relevant to the use in the method according to the invention. Whenever a new drive position, that is to say the coordinates of a new drive position, is recorded, the trace logger adds the coordinates to the FIFO and then applies a filter, which is also referred to as a region filter, in order to delete irrelevant data. This is illustrated by the flowchart in FIGS. 7 and 8.

Figure 5:
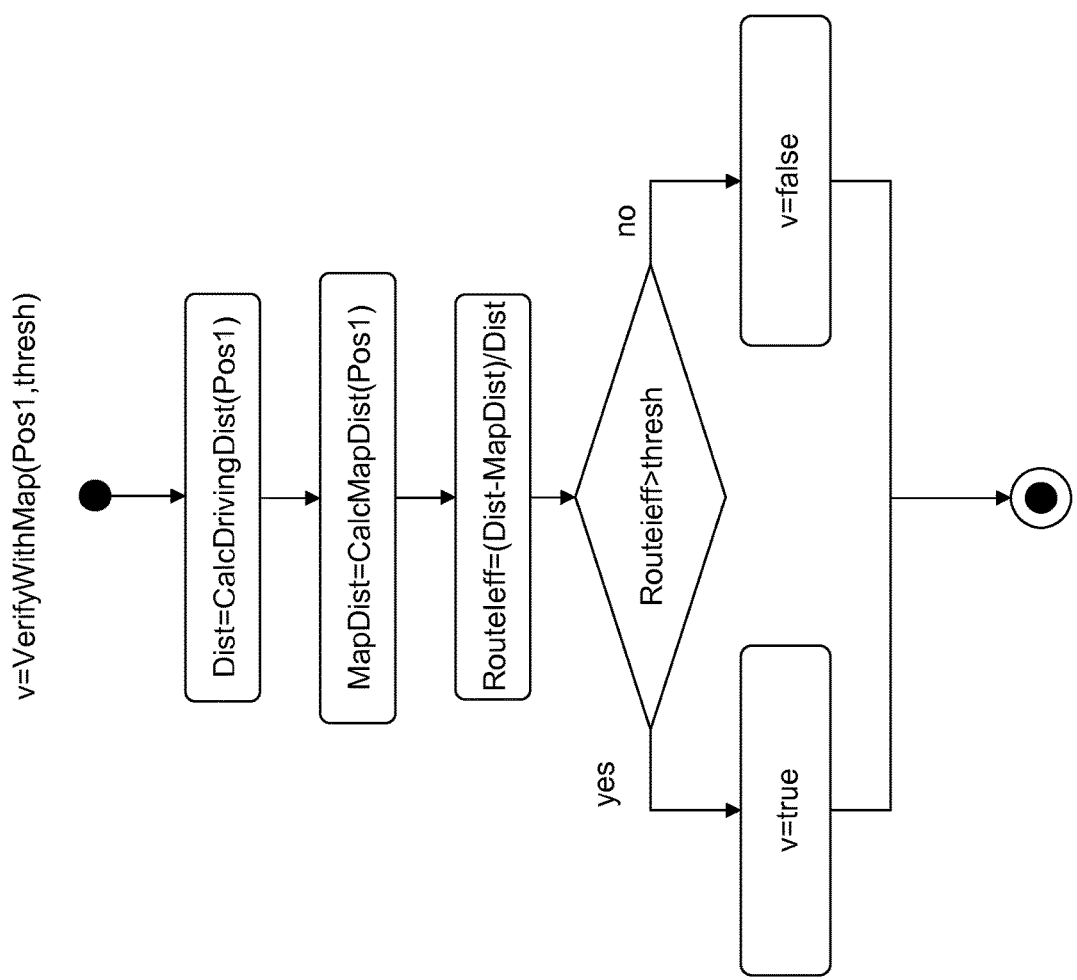
FIG. 5 schematically shows the verification of the inefficiency against the map data, in particular the route on the map, in accordance with one embodiment of the invention.
Figure 6:
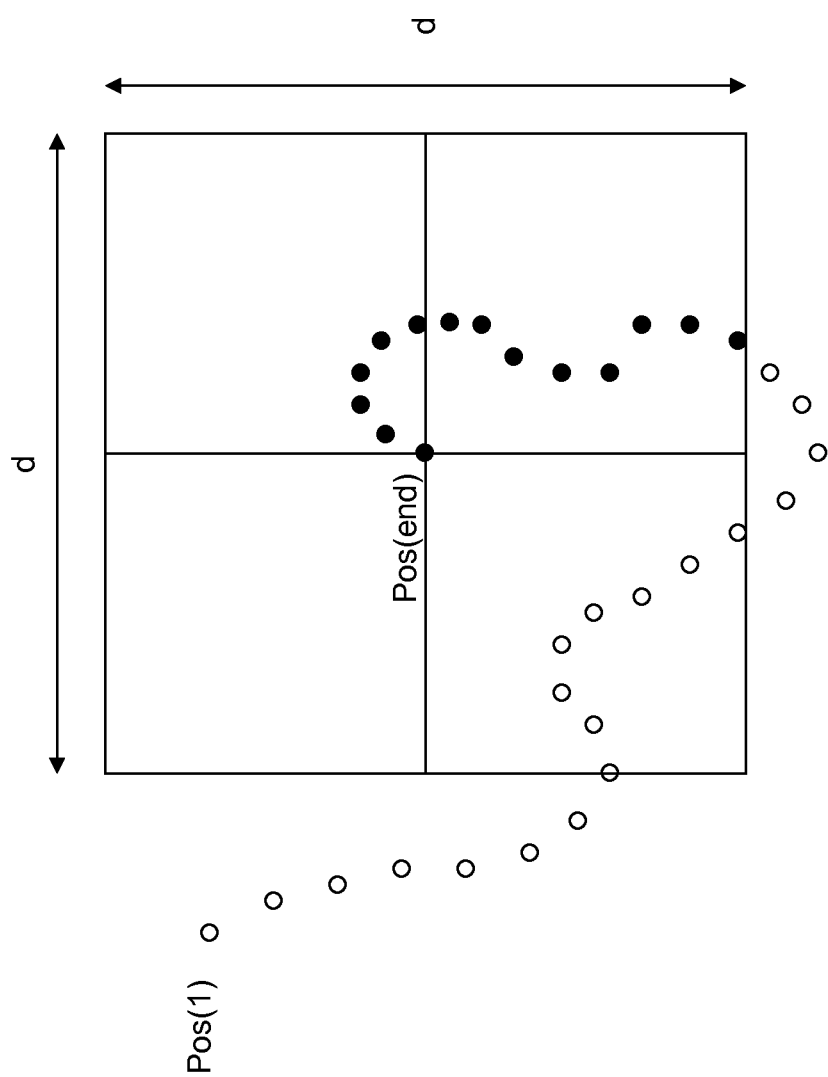
FIG. 6 schematically shows how a FIFO may contain only a continuous set of positions which form the relevant drive or trace, in accordance with one embodiment of the invention.

As the name already indicates, the region filter filters out positions, which are also referred to as points below, which are outside a predetermined region around the current position. For reasons of simplicity, this region is defined as a bounding box with an edge length of d km. Furthermore, only the last continuous region of successive points is retained. As a result, the FIFO contains only a continuous set of positions which form the relevant drive or trace. This is schematically shown in FIG. 6.

The implicit assumption here is that the parking space search traffic route is completely in the bounding box and accordingly the destination, which is generally in the vicinity of the parking position, is also in the bounding box.

Figure 9:
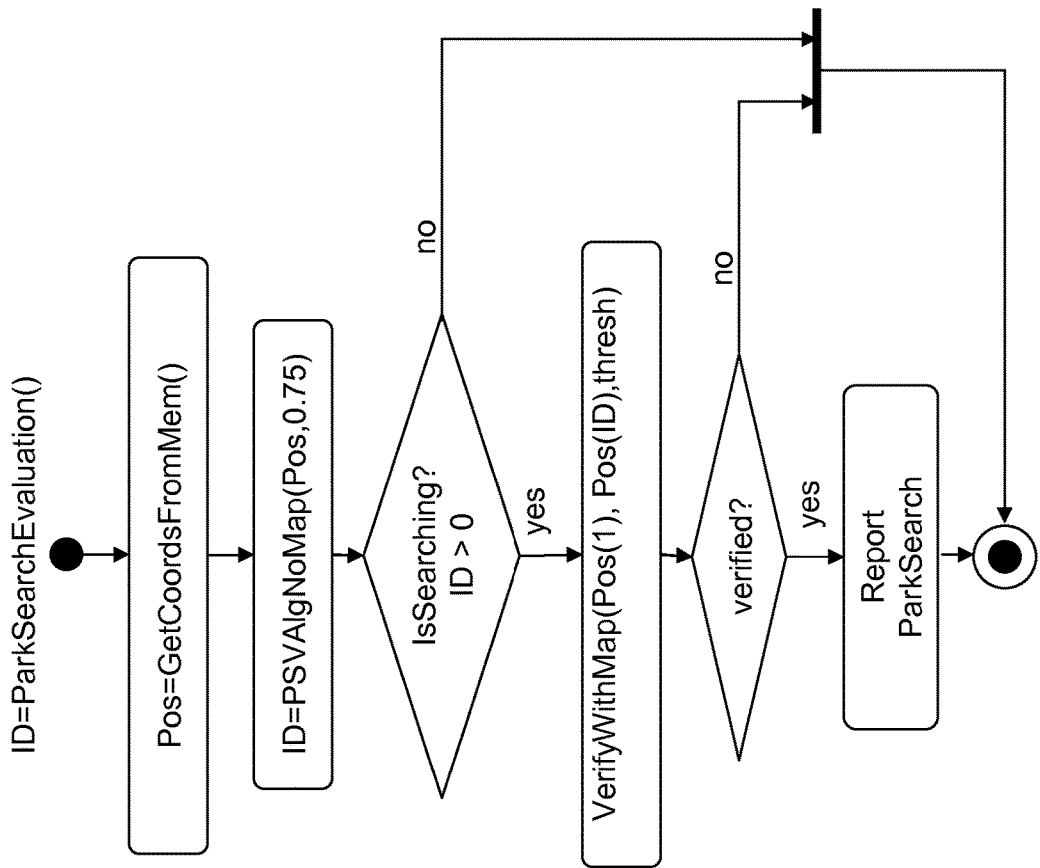
FIG. 9 sets forth a flowchart illustrating how the parking space search evaluation process analyzes the trace in the FIFO and provides an identifier of position at which parking space search traffic was detected, in accordance with one embodiment of the invention.

The second process of the method according to the invention or algorithm, which is also referred to as a parking space search evaluation process, is either triggered at the end of a drive or periodically at predetermined intervals of time during the drive. The parking space search evaluation process analyzes the trace in the FIFO and provides an identifier of the point, that is to say the position, at which parking space search traffic was detected. The basic steps of the method are shown in FIG. 9.

In a first step, all points are retrieved from the FIFO memory. Since only the points filtered by the region filter are stored in this memory, only the last continuous points within the predefined distance, in particular within the bounding box, are retrieved. This step is denoted Pos=GetCoordsFromMem in FIG. 9. In a next step, a first identification step for identifying ineffective driving for determining the parking space search traffic is carried out. This first identification step is carried out without using the map. This step is denoted ID=PSVAlgNoMap in FIG. 9. Since the first identification of the inefficiency for determining the parking space search traffic is carried out without using map data, computing time can be saved. In a further step, if an inefficiency has been detected in the first identification step, it is verified whether the inefficiency which could result in the identification of the parking space search traffic can be explained by the map, that is to say the courses of the roads in the map, and preferably also by the route guidance, for example of a navigation system. This verification step is denoted VerifyWithMap in FIG. 9. If the inefficiency cannot be explained by the map, the parking space search traffic is considered to have been detected and parking space search traffic is reported, and information relating to the position and time of the start of the parking space search traffic and the end position is output or stored. This step is denoted ReportParkSearch in FIG. 9.

In the first identification step PSVAlgNoMap, an inefficiency curve is calculated from the drive data and is defined as:

$$ieff = \frac{Dist - AirDist}{Dist}$$

where Dist is the driving distance between the previous positions and the end position P and AirDist is the linear distance. The position Pin with maximum inefficiency is then determined. If the inefficiency at this point is greater than a particular threshold value, parking space search traffic is assumed. This process is repeated with P=Pin until the drive can be divided into its efficient and inefficient parts. The chart in FIGS. 3 and 4 illustrates this process.

As soon as inefficient driving has been detected between point P and Pend in the step PSVNoMap, the step VerifyWithMap verifies whether the detected inefficiency can be explained by the map. In this case, the route inefficiency (Routeieff) is calculated again only for P. Instead of using the linear distance, the shortest route on the map is used. The algorithm reports parking space search traffic only if the inefficiency cannot be explained by the map, that is to say there is also route inefficiency in addition to the inefficiency.

The present invention has a number of advantages. In particular, the parking space search traffic can be reliably determined in a simple manner using the present method and computer program product. A more accurate determination of the parking space search traffic results in a more accurate prediction of parking information. In addition, it is an important item of information for urban planners. Furthermore, the present invention has the advantage that the method can be implemented in a standard vehicle, that is to say the required processing units are either already included in the vehicle or can be installed in the latter. This is possible, inter alia, because the method in the present invention, and therefore the algorithm which can be used to implement this method, is designed in such a manner that it can be carried out on a device provided in the vehicle. In particular, the memory use is low and the computation effort is small.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for generating a parking-space-search-traffic data object identifying the start of a search for a parking space, wherein the method comprises:
   generating, via a global positioning system unit, drive position data corresponding to a sequence of positions of the vehicle from a pre-end position along an actually driven path to an end position;
   identifying, via a processor, the pre-end position as inefficient by determining, from the drive position data, an inefficiency value for the pre-end position, wherein the inefficiency value is determined by comparing a cumulative distance to the end position with a linear distance to the end position, wherein the cumulative distance is the sum of straight-line distances between each successive position from the pre-end position to the end position, and the linear distance is the straight-line distance between the pre-end position and the end position;
   verifying, via the processor, the pre-end position as inefficient by comparing the cumulative distance with a route distance, the route distance being the distance of an efficient driving route from the pre-end position to the end position, as determined by a navigation unit;
   generating, via the processor, the parking-space-search-traffic data object, in response to verifying the pre-end position as inefficient, the parking-space-search-traffic data object identifying the pre-end position as the start of the search for parking; and
   outputting the parking-space-search-traffic data object for use in automatically identifying available parking for vehicles.

2. The method as claimed in claim 1, wherein determining the inefficiency value includes calculating an inefficiency curve as a function of each position and, determining that a maximum value for the inefficiency curve is exceeded at the first drive position.

3. The method as claimed in claim 1, wherein, determining the inefficiency value comprises calculating a quotient of: a difference between the cumulative distance and the linear distance, on one hand, and the cumulative distance, on the other hand.

4. The method as claimed in claim 2, wherein, determining the inefficiency value comprises calculating a quotient of: a difference between the cumulative distance and the linear distance, on one hand, and the cumulative distance, on the other hand.

5. The method as claimed in claim 1, wherein, verifying the pre-end position as inefficient comprises calculating a quotient of: a difference between the cumulative distance and the route distance, on one hand, and the cumulative distance, on the other hand.

6. The method as claimed in claim 2, wherein, verifying the pre-end position as inefficient comprises calculating a quotient of: a difference between the cumulative distance and the route distance, on one hand, and the cumulative distance, on the other hand.

7. The method as claimed in claim 1, wherein only the first position in the sequence for which an inefficiency has been identified, is verified.

8. The method as claimed in claim 1, wherein, prior to comparing the cumulative distance with the linear distance, the position data are filtered by checking their respective affiliation with a defined region.

9. The method as claimed in claim 8, wherein only continuous position data in the defined region are used for the comparison.

10. The method as claimed in claim 9, wherein the region is defined as a rectangle and the rectangle is defined around a current position of the vehicle.

11. The method as claimed in claim 1, wherein the method of claim 1 is performed during the drive of the vehicle and the end position corresponds to a destination of the drive.

12. The method as claimed in claim 1, wherein the method of claim 1 is performed after the conclusion of the drive of the vehicle and the end position corresponds to an actual parking position.

13. A computer program product, comprising:
a non-transitory processor-readable medium having processor executable code embodied therein to process position data relating to a vehicle in order to identify the start of a search for a parking space, the processor readable medium having processor executable code to:
generate, via a global positioning system unit, the position data corresponding to a sequence of positions of the vehicle from a pre-end position along an actually driven path to an end position;
identify the pre-end position as inefficient by determining, from the drive position data, an inefficiency value for the pre-end position, wherein the inefficiency value is determined by comparing a cumulative distance to the end position with a linear distance to the end position, wherein the cumulative distance is the sum of straight-line distances between each successive position from the pre-end position to the end position, and the linear distance is the straight-line distance between the pre-end position and the end position;
verify, via the processor, the pre-end position as inefficient by comparing the cumulative distance with a route distance, the route distance being the distance of an efficient driving route from the pre-end position to the end position, as determined by a navigation unit;
generate, via the processor, the parking-space-search-traffic data object, in response to verifying the pre-end position as inefficient, the parking-space-search-traffic data object identifying the pre-end position as the start of the search for parking; and
output the parking-space-search-traffic data object for use in automatically identifying available parking for vehicles.

* * * * *